(No Model.)
H. REUTER.
FAUCET.
No. 511,360. Patented Dec. 26, 1893.
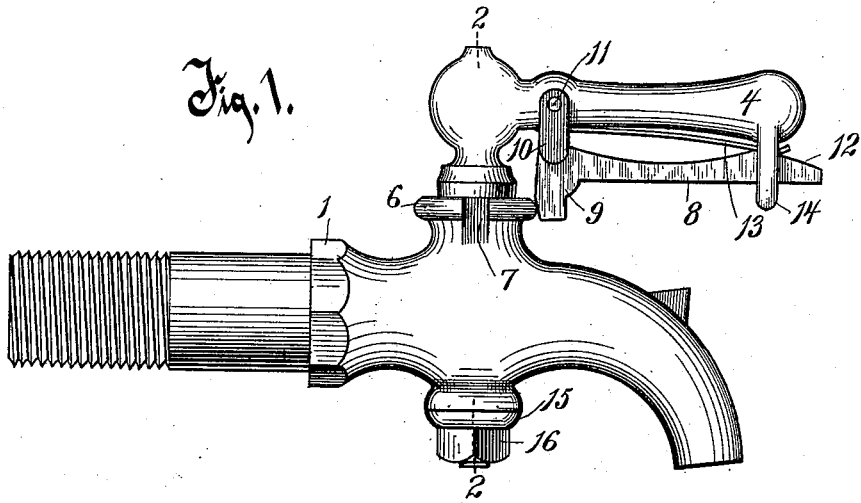
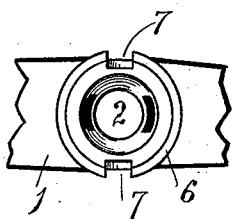
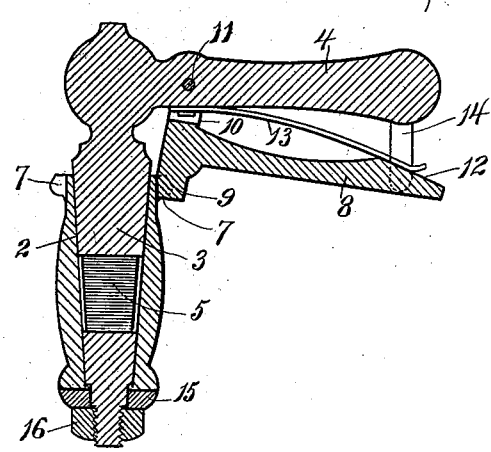
Witnesses.
O. H. Kenny
Anna V. Faust
Inventor.
Henry Reuter
By Benedict & Morsell
Attorneys.

UNITED STATES PATENT OFFICE.

HENRY REUTER, OF RICE LAKE, WISCONSIN.

FAUCET.

SPECIFICATION forming part of Letters Patent No. 511,360, dated December 26, 1893.

Application filed April 6, 1893. Serial No. 469,295. (No model.)

*To all whom it may concern:*

Be it known that I, HENRY REUTER, of Rice Lake, in the county of Barron and State of Wisconsin, have invented a new and useful Improvement in Faucets, of which the following is a description, reference being had to the accompanying drawings, which are a part of this specification.

My invention has relation to improvements in faucets, the same consisting in the improved construction and combination of parts as hereinafter more fully set forth.

In the accompanying drawings, Figure 1, is a side elevation of my invention showing the spigot or plug in its unlocked position. Fig. 2, is a transverse vertical section on the line 2—2 of Fig. 1, when the spigot or plug is adjusted to its locked position, and Fig. 3, is a plan view of a fragment of the faucet with the spigot or plug removed.

Referring to the drawings, the numeral 1 indicates the faucet proper having the threaded inlet end adapted for insertion in the threaded opening of the receptacle, not shown, and the usual outlet end communicating therewith. The horizontal passage formed by the communicating inlet and outlet portions of the faucet is intersected by a tapering or conical vertical opening 2, which forms the seat for a conical spigot or plug 3, provided with the usual operating handle 4 extending from its upper end, and near its lower end with an opening 5, which is adapted to be brought into register with the horizontal passage of the faucet. The metal surrounding the upper end of opening 2 is formed into a horizontal annular enlargement 6, provided with notches of recesses 7, 7, preferably two arranged at diametrically opposite points, and intersecting the perimeter of the enlargement, so as to form side notches or recesses.

The numeral 8 indicates a T-shaped locking dog or pawl. The inner head of this locking dog or pawl, on one side, is bifurcated, as indicated at 10, and the other side of the head is formed into a depending lug 9. The bifurcated portion straddles the handle 4, and is pivoted thereto by a transverse bolt 11, so that the pivotal point of the dog or pawl is at the inner end thereof. The outer end of the dog or pawl, on its upper side, is flattened and beveled downward, as indicated at 12, and upon this flattened surface rests the upturned end of a flat spring 13, said spring being curved upward and having its inner end secured to the under side of the handle 4, near the inner end of the latter, and preferably between the furcated part 10 of the dog or pawl. The spring pressure, therefore, on the dog or pawl is exerted on the end opposite to the pivoted end. The handle 4 is also provided with depending arms 14, 14, located near the outer end of said handle, and forming a guide for the operating end of the dog or pawl. The arms not only guide the free end of the dog or pawl 8 in its vertical movement, but, at the same time, inasmuch as the free end of the spring 13 lies between said arms, the spring is caused to maintain an even bearing on the dog. The lower end of the spigot or plug receives thereon a washer 15, which bears against the metal of the faucet, and the lower threaded end of the spigot or plug receives a jam nut 16 bearing against the washer, and preventing the spigot from being withdrawn.

In Fig. 1, the spigot or plug is shown adjusted to such position as to bring its opening in line with the horizontal passage in the faucet, so as to obtain a clear passage for the flow of the fluid the inner beveled edge of the depending lug 9 resting against the periphery of the annular enlargement 6. If, now, the spigot be turned by its handle until the latter assumes the position shown in Fig. 2, at right angles to its position in Fig. 1, the opening in the plug will be out of line with the horizontal passage of the faucet, and consequently the fluid will be prevented from flowing to the outlet end. The moment this latter position is reached, the depending lug is brought into register with one of the notches or recesses 7, and, by the action of the spring, the lug is made to engage said recess, and the spigot thus held in its adjusted position, the pressure of the spring tending to keep the lug in engagement. When it is desired to return the spigot to the position illustrated in Fig. 1, all that is necessary is simply to exert a pressure upon the outer end of the dog or pawl, which will have the effect of turning the inner end thereof upon its pivot and throwing the lug back out of engagement with and clear of the recess. The spigot is now of course free to be turned. When pressure is exerted upon the operating end of the dog or pawl in the manner just described, it has the effect of changing the spring from its curved or bowed form shown in Fig. 2 to a more straight form, as illustrated in Fig. 1, this being permitted from the fact that the outer end of the spring rests free and unattached upon the outer end of the dog or pawl, on the flattened and beveled upper side thereof.

It will be apparent from the above description that the improved locking pawl or dog used in connection with my invention is of an exceedingly strong and substantial nature, and therefore not liable to get out of order, and by the arrangement of the spring, the tension thereof will force the depending lug of the dog into one of the notches, when the handle is turned so as to stand in line with said notch.

Another important feature of my invention is the provision of the depending arms 14, above described, which are formed integral with the outer end of the handle 4. By this construction, the outer free operating end of the dog or pawl is not only accurately guided in its vertical movement, but, besides, the depending arms act to protect or guard said outer end of the locking dog or pawl from a lateral blow or force, which, if imparted thereto, through accident or otherwise, would have a tendency to wrench the inner end of the pawl or dog, and, if severe enough, bend, twist or break the pivot pin or bolt at said inner end.

Having thus described my invention, what I claim, and desire to secure by Letters Patent, is—

The combination, of a faucet provided with a passage way for the fluid, an intersecting opening, and with notches or recesses disposed in the metal circumferentially around one end of the intersecting opening, a spigot or plug for insertion in the intersecting opening, provided with an opening adapted to be brought into register with the passage for the fluid, and also formed or provided with a handle at right angles thereto, said handle provided at its outer end with depending arms, a dog or pawl parallel with, and beneath, the handle, provided at its inner end with a depending lug adapted to engage any of the notches or recesses, as the handle is brought into alignment therewith, said dog or pawl pivoted at its inner end to the handle, and having its outer operating end guided between, and protected by, the depending arms of the handle, and a spring having its inner end secured to the handle, and its outer end resting freely on the corresponding end of the dog or pawl between the depending arms of the handle, substantially as set forth.

In testimony whereof I affix my signature in presence of two witnesses.

HENRY REUTER.

Witnesses:
R. M. WHITAKER,
A. B. BAILEY.